United States Patent
Daneshrad et al.

(10) Patent No.: US 7,606,295 B2
(45) Date of Patent: Oct. 20, 2009

(54) GENERALIZED RAKE RECEIVER FOR WIRELESS COMMUNICATION

(75) Inventors: Babak Daneshrad, Encino, CA (US); Christian Oberli, Santiago (CL); Jatin Bhatia, Los Angeles, CA (US); Yogendra Shah, Exton, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 441 days.

(21) Appl. No.: 11/173,046

(22) Filed: Jul. 1, 2005

(65) Prior Publication Data

US 2006/0188007 A1  Aug. 24, 2006

Related U.S. Application Data

(60) Provisional application No. 60/656,062, filed on Feb. 24, 2005.

(51) Int. Cl.
H04B 1/707 (2006.01)
(52) U.S. Cl. ....................................................... 375/148
(58) Field of Classification Search ......... 375/142–144, 375/148, 150, 152, 260, 343; 370/332, 335, 370/342
See application file for complete search history.

(56) References Cited

U.S. PATENT DOCUMENTS

| | | | |
|---|---|---|---|
| 7,283,578 B2 | 10/2007 | Lin et al. | |
| 7,321,610 B2 | 1/2008 | Lu | |
| 7,440,492 B2 | 10/2008 | Maruyama | |
| 2003/0161390 A1* | 8/2003 | Teague et al. ................ | 375/148 |
| 2003/0231705 A1* | 12/2003 | Lewis .......................... | 375/150 |
| 2004/0048593 A1* | 3/2004 | Sano ............................ | 455/323 |
| 2004/0072553 A1* | 4/2004 | Wang et al. .................. | 455/334 |
| 2004/0114674 A1* | 6/2004 | Lotter et al. ................. | 375/148 |
| 2004/0120299 A1* | 6/2004 | Kidiyarova-Shevchenko et al. ........................... | 370/342 |
| 2004/0170218 A1* | 9/2004 | Molisch et al. .............. | 375/147 |
| 2004/0266383 A1* | 12/2004 | Mattellini et al. ........... | 455/307 |
| 2005/0047485 A1* | 3/2005 | Khayrallah et al. ......... | 375/148 |
| 2006/0067383 A1* | 3/2006 | Cozzo et al. ................. | 375/147 |

(Continued)

FOREIGN PATENT DOCUMENTS

EP  1 075 104  2/2001

(Continued)

OTHER PUBLICATIONS

Bottomley et al., "A Generalized Rake Receiver for Interference Suppression", IEEE Journal on Selected Areas in Communications, vol. 18, No. 8, Aug. 2000, pp. 1536-1545.

(Continued)

Primary Examiner—Young T. Tse
(74) Attorney, Agent, or Firm—Volpe and Koenig, PC (57) ABSTRACT

The present invention is related to a generalized rake receiver for a wireless communication system. The rake receiver comprises a plurality of finger correlators and a plurality of escort correlators. Each finger correlator demodulates each multipath components of the transmitted signal. The escort correlator is used for multipath tracking for optimal finger placement and weight estimation for demodulation. The escort correlator is located in vicinity of multipath center and is programmable within a chip and at a resolution finer than a chip. Weight vector is estimated using the estimate of the total base station energy based upon the pilot information from the base stations in soft-handoff.

25 Claims, 2 Drawing Sheets

U.S. PATENT DOCUMENTS

2006/0171448 A1 * 8/2006 Miller .................. 375/148

FOREIGN PATENT DOCUMENTS

| JP | 2007-080360 | 3/2004 |
|----|-------------|--------|
| WO | 02/21729 | 3/2002 |

OTHER PUBLICATIONS

Kutz et al., "Low Complexity Implementation of a Downlink CDMA Generalized Rake Receiver", Proceedings Vehicular Technology Conference, VTC 2002-Fall, 2002 IEEE 56$^{th}$, vol. 3, pp. 1357-1361.

Kutz et al., "On the Performance of a Practical Downlink CDMA Generalized Rake Receiver", Proceedings Vehicular Technology Conference, VTC 2002-Fall, IEEE 56$^{th}$, vol. 3, pp. 1352-1356.

* cited by examiner

GENERALIZED RAKE RECEIVER FOR WIRELESS COMMUNICATION

CROSS REFERENCE TO RELATED APPLICATION

This application claims the benefit of U.S. Provisional Application No. 60/656,062 filed Feb. 24, 2005, which is incorporated by reference as if fully set forth.

FIELD OF INVENTION

The present invention is related to wireless communication systems. More particularly, the present invention is related to a generalized rake receiver for wireless communication. The rake receiver may be utilized in all types of communication systems including, but not limited to, frequency division duplex (FDD), time division duplex (TDD), and time division-synchronous code division multiple access (TD-SCDMA) systems.

BACKGROUND

Rake receivers are widely used for demodulating signals transmitted in code division multiple access (CDMA) communication systems. The rake receiver is effective for demodulating signals which are subject to interference caused by multipath interference.

A rake receiver is utilized to despread transmissions received from a transmitter through utilization of a cross correlator and a code generator, as is conventional. The rake receiver receives both direct, (i.e. line of sight), RF waves as well as delayed, (i.e. multipath), RF waves due to different transmission path lengths, reflections, etc. Since the direct RF wave is not necessarily the strongest signal or is often not strong enough for reception, synthesizing, (i.e. combining), the energy of the direct RF waves with the energy of delayed waves results in better signal reception.

Each finger of a rake receiver is provided with a plurality of cross-correlators and co-generators for performing despreading. Time offset is adjusted using a delay circuit whereupon all the signals are added together after imposing the appropriate delays to these signals.

SUMMARY

The present invention is related to a generalized rake receiver for a wireless communication system. The rake receiver comprises a plurality of finger correlators and a plurality of escort correlators. Each finger correlator demodulates each multipath components of the transmitted signal. The escort correlator is used for multipath tracking for optimal finger placement and weight estimation for demodulation. The escort correlator is located in the vicinity of the multipath center and is programmable within a chip and at a resolution finer than a chip. A weight vector is estimated using the estimate of the total base station energy based upon the pilot information from the base stations in soft-handoff.

DETAILED DESCRIPTION OF THE PREFERRED EMBODIMENTS

Hereafter, the terminology "wireless transmit/receive unit" (WTRU) includes but is not limited to a user equipment, a mobile station, a fixed or mobile subscriber unit, a pager, or any other type of device capable of operating in a wireless environment. When referred to hereafter, the terminology "base station" includes but is not limited to a Node-B, site controller, access point or any other type of interfacing device in a wireless environment.

As implied by its name, the generalized rake receiver (G-rake) has a similar functional structure as a traditional rake receiver. However, there are three main features that differentiate the G-rake of the present invention from the traditional rake receiver. First, the location of fingers, (i.e., correlators) is different. In a typical rake receiver, fingers are placed on top of strong multipath components. In the G-rake of the present invention, fingers are not only positioned "on top" of the strong resolvable multipath components but some correlators are also placed in the vicinity of strong multipath components.

Second, the number of fingers is different. In a typical rake receiver, there may be as many as twice as many fingers as there are (strong) multipaths. In the G-rake of the present invention, the number of fingers does not have a direct relationship with the number of resolvable multipath components.

Third, the combining weight computation method is different. The finger combining weights for the traditional rake typically uses a maximum ratio combining (MRC) criterion to exploit the multipath diversity. The G-rake weights of the present invention are determined by a method derived from a formulation such as maximum likelihood (ML) estimation that models the intra-cell multi-access interference (MAI) and inter-cell interference as colored Gaussian noise and exploits the time-domain noise correlation for attaining improved performance.

Figure 1:
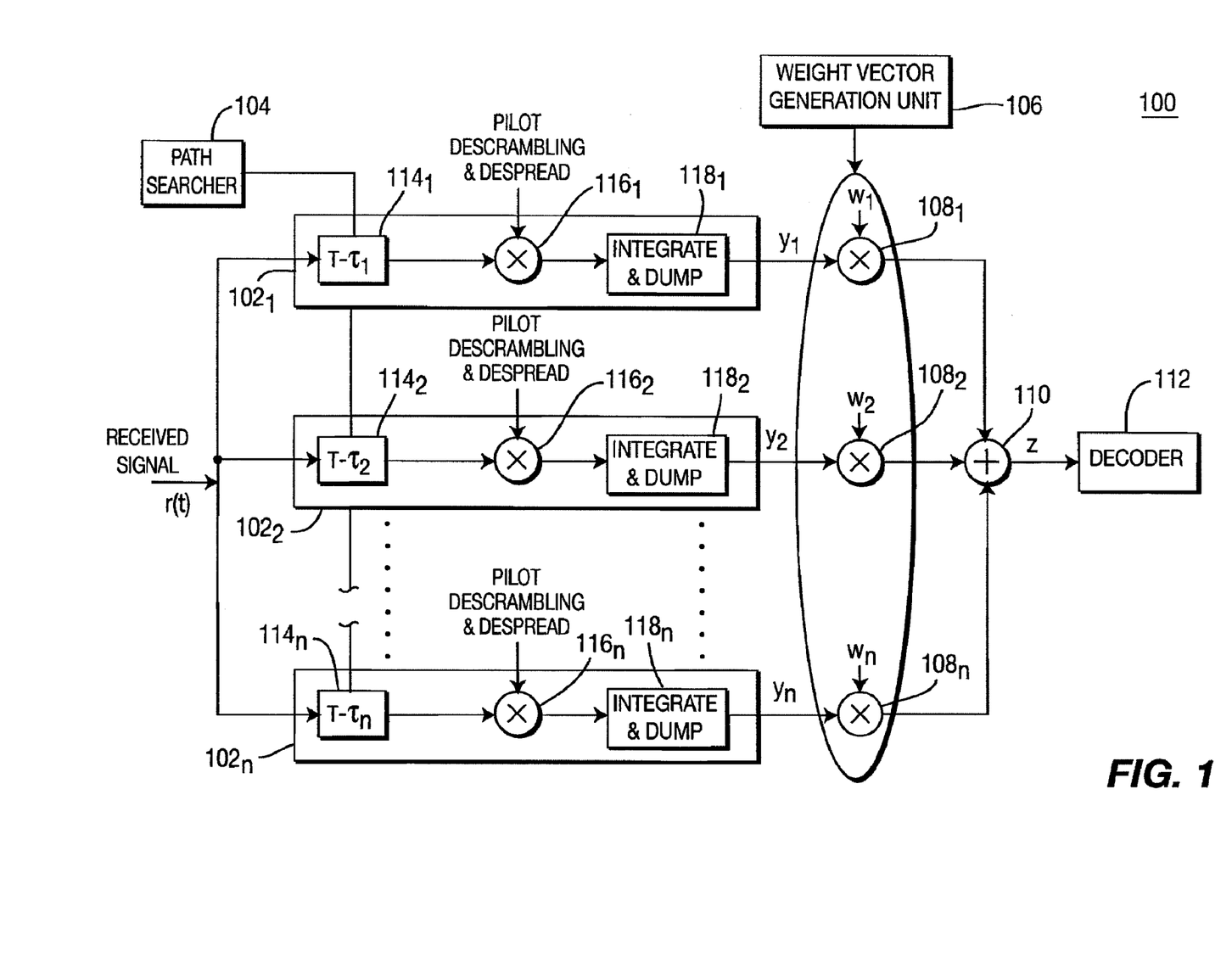
FIG. 1 is a block diagram of a generalized rake receiver in accordance with the present invention.

FIG. 1 is a block diagram of the G-rake 100 in accordance with the present invention. The G-rake 100 comprises a plurality of correlators $102_1$-$102_n$, a path searcher 104, a weight vector generation unit 106, a plurality of multipliers $108_1$-$108_n$, a combiner 110 and a decoder 112.

The received signal, r(t), comprises several multipath components whose outputs are combined by the combiner 110. The path searcher 104 tracks some of the strongest multipath components and outputs the locations to each of the correlators $102_1$-$102_n$. Each location has a different delay, $\tau_1$-$\tau_n$, corresponding to a strong and resolvable multipath component. The received signal, r(t), enters into the correlators $102_1$-$102_n$ and is delayed by each of the delay units $114_1$-$114_n$, which are configured by the path searcher 104.

The delayed versions of the received signal are multiplied by the scrambling code at each multiplier $116_1$-$116_n$ of each corresponding correlator $102_1$-$102_n$. The descrambled data of each path is despread by multiplying the descrambled data by the spreading code. The despread data is then integrated over one symbol period by an integrate and dump unit $118_1$-$118_n$, giving one complex sample output, $y_1$-$y_n$, per symbol.

Each correlator output, $y_1$-$y_n$, is multiplied by a corresponding weight values, $w_1$-$w_n$, which are determined by the weight vector generation unit 106, and the weighted values are combined by the combiner 110. The combined value, z, is output to the decoder 112 for soft symbol estimation.

In order to equalize the data signals after despreading and descrambling, channel estimation is required. There are many different ways of channel estimation based upon correlation of the pilot signal. It should be noted to those of skill in the art that any other method may be implemented instead of the one illustrated herein.

For example, in the downlink of the W-CDMA system, a common pilot channel (CPICH) is transmitted with a higher power than dedicated traffic channels. The CPICH is received by all the WTRUs in a given cell. The CPICH is transmitted with a constant spreading factor (SF) of 256 and a spreading code of all ones (1s). This means that there are 10 symbols per slot and 150 symbols per frame of CPICH in the W-CDMA system. All the symbols of the CPICH are 1+j.

A common method of channel estimation is based upon a multi-dwell algorithm. The received signal is correlated in segments of 256 chips, (i.e. one CPICH symbol), with the descrambling sequence, (i.e. the CPICH signal), with delays corresponding to each multipath component, as shown in FIG. 1. Then, for each multipath delay the result of this correlation operation is averaged over a moving window of a few pilot symbols, (each of 256 chips), to produce an estimate of the corresponding multipath complex amplitude. This follows from the fact that all CPICH symbols have value of 1. The conjugate of the estimated channel path amplitudes are then used to equalize the data signals after despreading and descrambling.

A typical size of the averaging window is on the order of 10 CPICH symbols. The window shape can be perfectly rectangular, corresponding to low-pass sin(x)/x-shaped filter frequency response. Further optimization of the filter in terms of the window size, (i.e., the number of memory elements in the tap-delay line), and frequency response is possible.

Computation of weight vector is explained hereinafter. The decision variable z results from multiplying the vector of combining weight vector w by the vector of correlator output y as follows:

$$z = w^H y;$$ Equation (1)

where H indicates the Hermitian transposition. The dimension of w and y is J×1, where J is the number of correlator branches. This operation is the same as with the traditional rake receiver. However, the position and the number of correlators are both input parameters to the G-rake of the present invention.

The vector y, (i.e., the correlator outputs), can be expressed as the superposition of the desired signal $y_d$, a self-interference component $y_{ISI}$ due to the channel and root raised cosine (RRC) filter dispersion, a multiuser interference component $y_{MUI}$ due to interference from other orthogonal multi-user channels, and a noise component n due to other-cell interference and additive white Gaussian noise (AWGN), as shown in Equation (2):

$$y = \sqrt{E_0} y_d \cdot s_0 + \sqrt{E_0} y_{ISI} + \sqrt{E_I} y_{MUI} + \sqrt{N_0} n.$$ Equation (2)

In Equation (2), $s_0$ is the desired data symbol and all vectors are J×1 in size. The scalars $E_0$, $E_I$ and $N_0$ are relative energy terms. $E_0$ is the energy per symbol period (not chip period) of user 0 (the desired user), $E_I$ is the total energy per symbol period of the remaining users in the cell, (i.e. users 1 to K−1, where K is the total number of users served by the base station's downlink), and $N_0$ is the other-cell interference and AWGN energy per symbol period.

In accordance with the present invention, the G-rake combining weight vector w is calculated using the interference model of Equation (2) along with the maximum likelihood (ML) criterion on $y_d$. The matrix-vector multiplication of Equation (3) provides the G-rake combining weights:

$$w = R_u^{-1} h;$$ Equation (3)

where $R_u$ and h are given by:

$$R_u = E_0 R_{ISI} + E_I R_{MUI} + N_0 R_n; \text{ and,}$$ Equation (4)

$$h = \sqrt{E_0} y_d.$$ Equation (5)

In Equation (4), the three matrices $R_{ISI}$, $R_{MUI}$ and $R_n$ are of dimension J×J, and they are the fundamental components of the G-rake weights. They represent, respectively, the autocorrelation of $y_{ISI}$, $y_{MUI}$ and n and their elements are obtained as follows:

$$R_{ISI}(j,k) = \sum_{i=-\infty}^{\infty} \sum_{m=1-SF_{USER}}^{SF_{USER}-1} [1 - \delta(i)]$$

$$(SF_{USER} - |m|) \cdot \left\{ \sum_{l=0}^{L-1} [g_l \cdot R_p(d_j + mT_c - iT - \tau_l)] \cdot \sum_{q=0}^{L-1} [g_q \cdot R_p(d_k + mT_c - iT - \tau_q)]^* \right\},$$
Equation (6)

$$R_{MUI}(j,k) = \sum_{i=-\infty}^{\infty} \sum_{m=1-SF_{USER}}^{SF_{USER}-1} [1 - \delta(m)]\delta(i)$$

$$(SF_{USER} - |m|) \cdot \left\{ \sum_{l=0}^{L-1} [g_l \cdot R_p(d_j + mT_c - iT - \tau_l)] \cdot \sum_{q=0}^{L-1} [g_q \cdot R_p(d_k + mT_c - iT - \tau_q)]^* \right\}$$
Equation (7)

$$R_n(j,k) = R_p(d_j - d_k).$$ Equation (8)

where j and k are matrix indices, $d_j$ and $d_k$ are the delays of the j-th and k-th correlator branches (i.e., position of the j-th and k-th finger), $g_l$ is complex amplitude of the l-th multipath of the channel impulse response (CIR). The multipath delays are given by $\tau_l$ and $R_p(t)$ is the autocorrelation function of the RRC chip pulse shape used at the transmitter and receiver.

The elements of $R_{ISI}$, $R_{MUI}$ and $R_n$ represent correlation measures of the received signal over time-differences that exist between all pairs of correlator branches of the G-rake. Furthermore, these correlation measures depend on the characteristics of the filters through which the signal has passed on its way from the transmitter to the receiver (i.e., the dispersive channel and the RRC filters).

Finally, the vector $y_d$ is given by:

$$y_d(j) = \sum_{l=0}^{L-1} g_l R_p(d_j - \tau_l).$$ Equation (9)

The present invention addresses three issues in practical implementation of the G-rake of the present invention in a CDMA2000 or W-CDMA scenario. The first issue is how to choose the position of the correlator branches; the second is how to choose the number of correlator branches; and the third is how to calculate the combining weights w in practice. The third issue has various separable components, namely: i) calculating the matrices $R_{ISI}$, $R_{MUI}$, $R_n$ and the vector $y_d$; ii) determining the energy terms $E_0$, $E_I$ and $N_0$; and, iii) solving the matrix inversion problem of Equation (3). Each of the foregoing issues is addressed hereinafter.

1) Choosing the number of correlator branches.

In the G-rake of the present invention, as in a conventional rake, the fingers are normally placed on the strongest arriving multipaths. The placement of the escorts may be in any given position surrounding the multipath components, preferably both or either side of the multipath components. The number of escorts can be one (1) per finger or more. In order to reduce computational complexity, for example in the case of a time multiplexed finger processor, the number of total correlators may be reduced to as few as twice the number of significant multipath components present in the channel impulse response.

2) Correlator placement method.

The problem of optimal finger placement has no close form solution and requires a prohibitively complex search procedure. Given a specific weight vector w, the symbol signal to noise ratio (SNR) at the output of a rake combiner, (i.e. the SNR of the decision statistic z, in Equation (1), can be shown to be:

$$SNR = \frac{w^H h h^H w}{w^H R_u w}. \qquad \text{Equation (10)}$$

Then, given the number of correlators, a search procedure considers evaluating Equation (10) for all possible combinations of finger positions in a window of potential finger delays within a range that spans the entire CIR with some excess. This implies, of course, recalculating the weight vector w each time, which renders the algorithm absolutely impractical.

The present invention utilizes the following very simple, sub-optimal algorithm, in order to obtain most of the G-rake performance gain. It should be noted that the configuration provided hereinafter is provided as an example, and it is obvious to those skilled in the art that any other variance may be implemented.

For ease of description, the following terminology is used throughout the present invention hereinafter. A "finger" is a correlator whose position corresponds to a specific multipath component of the channel impulse response, (i.e., the finger "sits" right on top of a multipath component). As with conventional rake receivers, the function of the fingers is to capture signal energy and exploit multipath diversity gain.

An "escort" is a correlator with identical architecture and functionality as a finger, but it is placed on a position at which the channel impulse response has no multipath component. For the G-rake receiver of the present invention, escorts are typically placed right next to fingers, before and/or after, and the function of the escorts is to exploit the coloration of noise and interference in order to improve the output SNR of the combiner. Escort fingers are placed at equi-positions and preferably within a chip resolution, typically at ½ chip period before and/or ½ chip period after the fingers. If escorts of one finger overlap other escorts or other fingers, then the spare correlator can be used as an escort for the finger on the next strongest path, or not used at all.

3) Calculation of the combining weights.

A procedure for calculating the combining weights starts from calculation of the matrices $R_{ISI}$, $R_{MUI}$, $R_n$ and the vector $y_d$. The matrices $R_{ISI}$, $R_{MUI}$, $R_n$ and the vector $y_d$ are obtained by Equations (6)-(9). The above equations correspond, respectively, to element (j, k) of the matrices R, or element j of the vector $y_d$. Elements j and k are integer indices that run between 1 and J, (the number of correlators, i.e., fingers plus escorts). Practical implementation of the above expressions requires first translating them into a suitable discrete-time form and then identifying a format that requires the least amount of (hardware) computations during runtime.

Equations (6)-(9) are translated into a form that accommodates for discrete input signals, (i.e., received signals sampled at sub-chip rate), for corresponding fractionally spaced placement of fingers and escorts, and for discrete channel multipath estimates with sub-chip resolution.

Equations (6)-(9) involve evaluating the continuous-time autocorrelation function of the RRC chip-pulse shaping filter impulse response. For implementing the filter, the corresponding autocorrelation sequence of the fractionally spaced, discrete RRC pulse shape sequence shall be used. This sequence is obtained as follows from the impulse response sequence of the RRC pulse shape:

$$R_p(n) = x_{RRC}(-n)_l^* x_{RRC}(n) \qquad \text{Equation (11)}$$

$$= \sum_m x_{RRC}(n+m) \cdot x_{RRC}(m);$$

where n is an integer time index that corresponds to the sub-chip sample rate, $X_{RRC}(n)$ is the real-valued, fractionally-spaced impulse response sequence of the RRC pulse shape, and *l denotes linear discrete convolution.

For evaluating Equations 6 and 7, the following interpretation for each parameter of the argument of $R_p(d_j+mT_c-iT-\tau_l)$ is adequate:

$d_j$: An integer that represents the relative delay in sub-chip units of the j-th correlator.

$mT_c$: Use m×USF, where USF indicates the upsampling factor, (i.e. per-chip sampling resolution), of the sampled signal stream with respect to chip rate (for example, USF=2).

iT: Use i×USF×$SF_{USER}$.

$\tau_l$: An integer that represents the relative delay in sub-chip units of the l-th estimated multipath.

The summation index i of the infinite sum in Equations 6 and 7 only appears in the argument of $R_p(d_j+mT_c-iT-\tau_l)$. The discrete sequence representing $R_p(n)$, however, is only non-zero in a finite range around n=0, which turns the infinite summation into a realizable sum of a finite number of terms. The following summation range for i ensures that no non-zero values of $R_p(n)$ are left out for any occurrence of the argument $d_j+mT_c-iT-\tau_l$ (evaluated with the discrete interpretation established above):

$$\text{abs}(i) \leq \frac{\tau_L - \tau_0 + (SF_{USER}+3) \cdot USF + 31}{SF_{USER} \cdot USF} \triangleq i_0. \qquad \text{Equation (12)}$$

Finally, the value used for $g_l$ (and $g_q$) in Equations (6) and (7) shall be used as the complex amplitude of the l-th estimated multipath.

Evaluating Equations (8) and (9) follows directly from the above analysis for Equations (6) and (7). Thus, the following disrete-time formulations of the G-rake Equations (13) to (16) are established:

$$R_{ISI}(j, k) = \quad \text{Equation (13)}$$

$$\sum_{i=-i_0}^{i_0} \sum_{m=1-SF_{USER}}^{SF_{USER}-1} [1 - \delta(i)](SF_{USER} - |m|) \cdot \sum_{l=0}^{L-1} \sum_{q=0}^{L-1} \hat{g}_l$$

$$\hat{g}_q^* \cdot R_p(d_j + m \cdot USF - i \cdot USF \cdot SF_{USER} - \hat{\tau}_l) \cdot$$

$$R_p^*(d_k + m \cdot USF - i \cdot USF \cdot SF_{USER} - \hat{\tau}_q)$$

$$R_{MUI}(j, k) = \quad \text{Equation (14)}$$

$$\sum_{i=-i_0}^{i_0} \sum_{m=1-SF_{USER}}^{SF_{USER}-1} [1 - \delta(m)\delta(i)](SF_{USER} - |m|) \cdot \sum_{l=0}^{L-1} \sum_{q=0}^{L-1} \hat{g}_l$$

$$\hat{g}_q^* \cdot R_p(d_j + m \cdot USF - i \cdot USF \cdot SF_{USER} - \hat{\tau}_l) \cdot$$

$$R_p^*(d_k + m \cdot USF - i \cdot USF \cdot SF_{USER} - \hat{\tau}_q)$$

$$R_n(j, k) = R_p(d_j - d_k) \quad \text{Equation (15)}$$

$$y_d(j) = \sum_{l=0}^{L-1} \hat{g}_l R_p(d_j - \hat{\tau}_l) \quad \text{Equation (16)}$$

As a further refinement, complexity reduction may be achieved by neglecting $R_{ISI}$. In many cases, the $R_{MUI}$ dominates over $R_{ISI}$, and $R_{ISI}$ only has a marginal effect on the G-rake weights.

Hardware implementation of equations (13)-(16) with minimum runtime complexity may be simplified using lookup table (LUT). For example, equation (13) is rearranged as follows:

$$R_{ISI}(j, k) = \sum_{l=0}^{L-1} \sum_{q=0}^{L-1} \hat{g}_l \hat{g}_q^*$$

$$\underbrace{\sum_{i=-i_0}^{i_0} \sum_{m=1-SF_{USER}}^{SF_{USER}-1} [1 - \delta(i)](SF_{USER} - |m|) R_p(d_j - \hat{\tau}_l + m \cdot USF - i \cdot USF \cdot SF_{USER}) \cdot R_p^*(d_k - \hat{\tau}_q + m \cdot USF - i \cdot USF \cdot SF_{USER})}_{=f(d_j - \hat{\tau}_l, d_k - \hat{\tau}_q)}$$

The double sum underlined by a brace is a function of only two runtime parameters, i.e., parameters that are determined at transmission time and that are unknown at implementation time. These parameters, $p_1$ and $p_2$, are respectively $p_1 = d_j - \hat{\tau}_l$ and $p_2 = d_k - \hat{\tau}_q$. Therefore, the entire expression underlined by the brace can be implemented on hardware as a two-dimensional LUT as follows:

$$R_{ISI}(j, k) = \sum_{l=0}^{L-1} \sum_{q=0}^{L-1} \hat{g}_l \hat{g}_q^* \cdot LUT_{ISI}(d_j - \hat{\tau}_l, d_k - \hat{\tau}_q) \quad \text{Equation (6)}$$

For typical values of $d_j$ and $\tau_l$ in 3G applications, the size of this LUT may be on the order of ½×5USF×5USF, which exploits the symmetry of the autocorrelation sequence $R_p(n)$ and the fact that it is significantly non-zero only in the proximity of n=0. The LUT may be further shrunk to smaller sizes.

For computing the elements $R_{MUI}(j,k)$, $R_n(j,k)$ and $y_d(j)$, an identical LUT-approach may be utilized. In the former case, $LUT_{MUI}(p_1,p_2)$ is, in fact, very similar to $LUT_{MUI}(p_1,p_2)$. The case of $R_n(j,k)$ and $y_d(j)$ is even simpler since they can share a one-dimensional LUT for the autocorrelation sequence $R_p(n)$.

Determining $E_0$, $E_I$ and $N_0$.

As an example, the present invention describes a proper format of the energy terms in a CDMA2000 or W-CDMA context and then a potential way to estimate them within that context is described. Even though the following description specifically mentions W-CDMA high speed downlink packet access (HSDPA), it should be known to those skilled in the art that the present invention can be applied to any other wireless communication systems.

$E_0$, $E_I$ and $N_0$ in the context of HSDPA.

$E_0$ is the energy per symbol period of the desired user, $E_I$ is the total energy per symbol period of the remaining users in the cell, (i.e. users 1 to K−1, where K is the total number of users served by the base station's downlink), and $N_0$ is the other-cell interference and AWGN energy per symbol period.

In HSDPA, the concept of user corresponds to one single code of the desired user, who has been assigned a number Nc of codes for a high-speed downlink transmission. Additionally, other non-user sources of in-cell interference energy present in the HSDPA downlink, (and in W-CDMA in general), such as the CPICH, must be considered as well in the calculation of $E_I$. Finally, the concept of symbol period should be noted, since in W-CDMA the spreading factor varies from user to user.

In light of the above considerations, the CPICH and the other in-cell user's interference share a total power of one. The following Equations (18)-(20) are derived for computing $E_0$, $E_I$ and $N_0$:

$$E_0 = \left(\frac{E_c}{I_{or}}\right)_{USER} \times \frac{1}{N_c}; \quad \text{Equation (18)}$$

$$E_I = \underbrace{\left(\frac{E_c}{I_{or}}\right)_{USER} \times \frac{N_c - 1}{N_c}}_{\text{Self-interference of USER's other codes}} +$$

$$\underbrace{\left(\frac{E_c}{I_{or}}\right)_{CPICH}}_{\text{CPICH interference}} + \underbrace{\left[1 - \left(\frac{E_c}{I_{or}}\right)_{USER} - \left(\frac{E_c}{I_{or}}\right)_{CPICH}\right]}_{\text{Other in-cell user's interference}}; \quad \text{Equation (19)}$$

$$N_0 = \frac{SF_{USER}}{\frac{I_{or}}{I_{oc}}}; \quad \text{Equation (20)}$$

wherein Ior, Ioc and Nc represent a total received power, a total interference power, and the number of codes assigned to the user, respectively.

An alternative formulation of Equation (4) which is independent of $E_I$ and equivalent to Equation (4), (except for a scaling factor), is provided as follows:

$$R_u = R_{ISI} + \frac{E_T - E_0}{E_0} R_{MUI} + \frac{N_0}{E_0} R_n; \quad \text{Equation (21)}$$

where $E_T$ is the total base station power.

For estimating $E_0$, the following approach is taken by the present invention. HSDPA provides a high speed downlink shared channel (HS-DSCH) transport channel. At the physical layer, the HS-DSCH is mapped to a high speed physical downlink shared channel (HS-PDSCH) and is also associated with one downlink dedicated physical channel (DPCH). The DPCH must in fact be active for the desired user as a prerequisite for a HSDPA service. The DPCH contains a subchannel for control purposes, known as a dedicated physical control channel (DPCCH). The DPCCH includes physical layer control information including known pilot bits and feedback commands for closed loop power control, (in both the uplink and downlink), among others. The pilot bits are a predefined sequence that can be used at the receiver for channel and/or power estimation. The estimate of $E_0$ may be obtained from the pilot symbols included in the DPCCH.

$E_T$ can be estimated approximately from the CPICH signal by considering that its power is typically on the order of 10% of the total base station's transmitted power. This proportion varies as the base station serves more or less users. In accordance with a sensitivity analysis of bit error rate (BER) vs. $E_T$ estimation error, for positive Ior/Ioc, it is better to overestimate $E_T$ and for negative Ior/Ioc, it is better to underestimate $E_T$. Approximating $E_T$ as 5 to 10 times the CPICH power results in nearly optimal performance. Severely underestimating $E_T$ or approximating it by $E_T \approx 0$ causes the G-rake to converge into the conventional rake's performance, since $R_u \rightarrow I$.

Further refinement of the estimate may be obtained from the knowledge that as the WTRU approaches cell edge, the interference conditions force the WTRU to enter into a soft-handoff. This is a leading indicator of negative Ior/Ioc conditions and aids in establishing a more accurate estimate of $E_T$. For example, the estimate of the pilot energy from each cell, (CPICH or the pilot signal in the DPCCH), can be used to gain an estimate of the base station energy from each cell and estimate the fraction of the incoming energy attributable to the HSDPA serving cell when in soft-handoff.

The matrix inversion of Equation (3) can be attained by numerical methods such as Choleski factorization or Gauss-Seidel iterations. The advantage of using Gauss-Seidel iterations is that computational load can be traded off for performance. Close to ideal G-rake performance is realized with only 3 iterations.

The multipath delay estimates can typically be assumed static throughout the duration of one FDD frame, while the multipath amplitude estimates typically need to be updated time slot by time slot. This fact can be exploited for reducing the computational load of updating the combining weights, (and the channel estimates), on every time slot. The estimate of the Doppler spread or speed of the WTRU can be used to further vary the update frequency of the weights based upon the Doppler spread. The lower the Doppler effect, the lower the update frequency for the weights and channel estimates.

Figure 2:
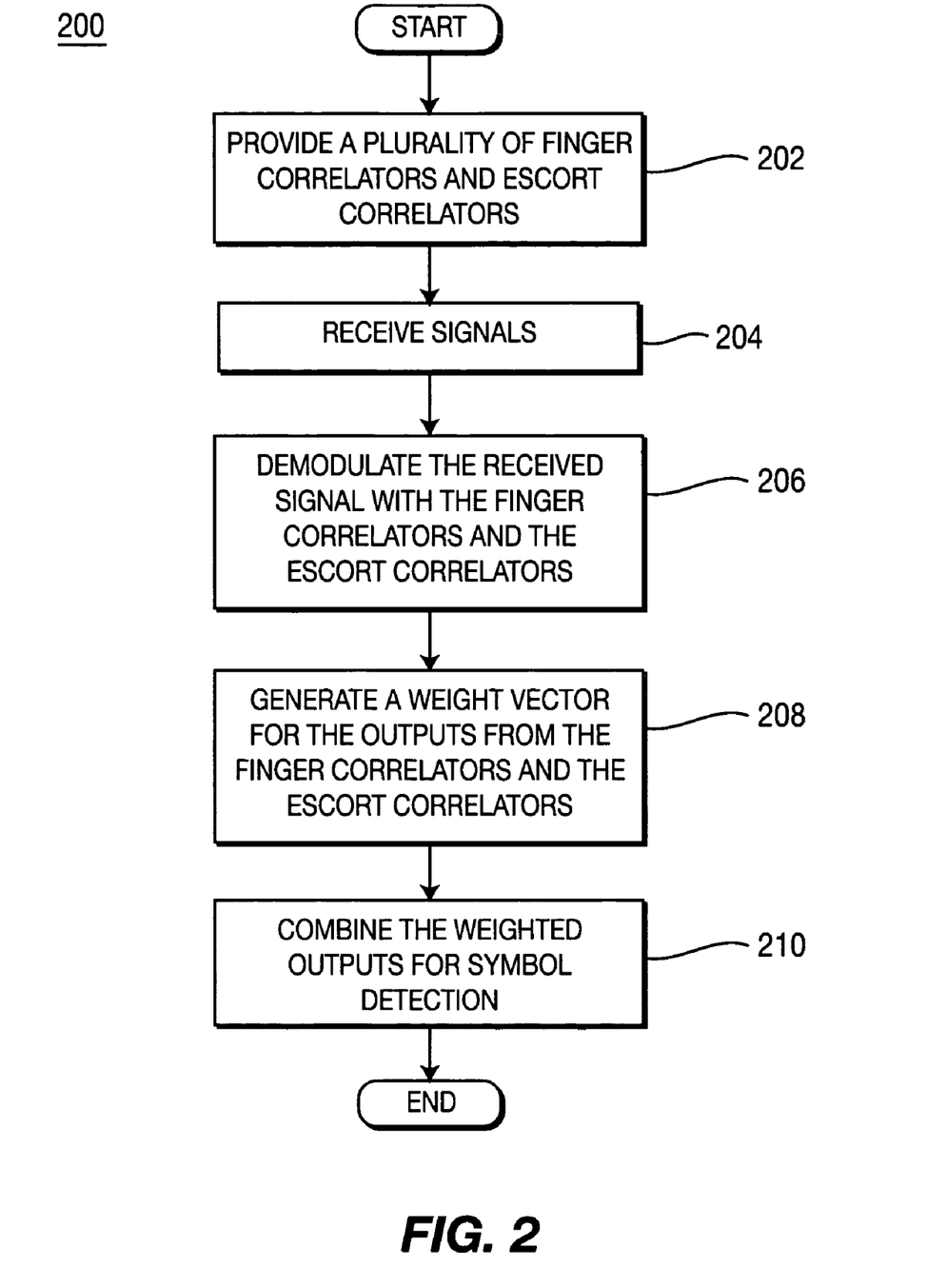
FIG. 2 is a flow diagram of a process for implementing a generalized rake receiver in accordance with the present invention.

FIG. 2 is a flow diagram of a process 200 for implementing a generalized rake receiver in accordance with the present invention. A plurality of finger correlators and escort correlators are provided in a receiver (step 202). The receiver receives signals from a transmitter (step 204). The received signals are demodulated with the finger correlators and the escort correlators (step 206). The finger correlators process the received signals in a location corresponding to each of a plurality of the strongest multipath components of the transmitted signal, and the escort correlators process the received signal in a location deviated from the location of the corresponding finger correlator. Each finger correlator and escort correlator generates an output per symbol period. A weight vector is generated for weighting the outputs from the finger correlators and the escort correlators (step 208). The weighted outputs are combined for symbol detection (step 210).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A rake receiver for code division multiple access (CDMA) communication, the rake receiver comprising:
   a plurality of finger correlators, each finger correlator demodulating a transmitted signal in a location corresponding each of a plurality of strong multipath components of the transmitted signal; and
   a plurality of escort correlators, each escort correlator demodulating the transmitted signal in a location within a predetermined distance from the location of a corresponding finger correlator, the escort correlators being utilized for tracking the multipath components.

2. The rake receiver of claim 1 wherein each escort correlator is associated with a corresponding finger correlator.

3. The rake receiver of claim 2 wherein each escort correlator is located ½ chip apart from the location of the corresponding finger correlator.

4. The rake receiver of claim 3 wherein each escort correlator is located in either side of the corresponding finger correlator.

5. The rake receiver of claim 1 further comprising:
   a weight vector generation unit for calculating a weight vector to be applied to outputs of the finger correlators and the escort correlators, the weight vector w being estimated by a following equation: $w = R_u^{-1} h$, wherein $R_u$ and h are given by: $R_u = E_0 R_{ISI} + E_I R_{MUI} + N_0 R_n$ and $h = \sqrt{E_0} y_d$, $R_u$ is a matrix defining total noise covariance, $R_{ISI}$, $R_{MUI}$ and $R_n$ represent autocorrelation of inter-symbol interference component, multiuser interference component and noise component, respectively, $E_0$, $E_I$ and $N_0$ represent energy per symbol period of a desired user, total energy per symbol period of remaining users in a cell, and other-cell interference and additive white Gaussian noise, respectively, and $Y_d$ represents a desired signal.

6. The rake receiver of claim 5 wherein the weight vector is estimated utilizing a total base station energy, the total base station energy being determined by at least one of:
   estimating based on a received pilot sequence; and
   approximating from a received common pilot channel (CPICH).

7. The rake receiver of claim 6 wherein:
   the total base station energy is overestimated when Ior/Ioc is positive, Ior and Ioc representing a total received power and a total interference power, respectively;
   the total base station energy is estimated as five (5) to ten (10) times a CPICH power; and
   the total base station energy is underestimated when Ior/Ioc is negative, Ior and Ioc representing "the total received power and the total interference power" for respectively.

8. The rake receiver of claim 5 wherein the weight vector is calculated disregarding inter-symbol interference.

9. The rake receiver of claim 5 wherein inversion of the matrix $R_u$ is performed by one of Choleski factorization and Gauss-Seidel iterations.

10. The rake receiver of claim 5 wherein energy per symbol period of the desired user is estimated using a pilot sequence, and the pilot sequence is transmitted via a dedicated physical control channel (DPCCH).

11. The rake receiver of claim 5 wherein update of the weight vector is varied depending on estimate of Doppler spread and speed of the desired user.

12. The rake receiver of claim 5 wherein delay estimates of the multipath components are to be static throughout duration of one frame and amplitude estimates of the multipath components are updated time slot by time slot.

13. The rake receiver of claim 5 wherein a lookup table is utilized in obtaining $R_{ISI}$, $R_{MUI}$ and $R_n$.

14. A method for combining multipath components in a rake receiver for code division multiple access (CDMA) communication, the method comprising:
 receiving a signal comprising a plurality of symbols;
 demodulating the received signal with a plurality of finger correlators in a location corresponding each of a plurality of strong multipath components of the received signal to generate a finger correlator output;
 demodulating the received signal with a plurality of escort correlators in a location within a predetermined distance from the location of a corresponding finger correlator to generate an escort correlator output;
 applying a weight vector to outputs from the finger correlators and the escort correlators; and
 combining the weighted outputs for symbol detection.

15. The method of claim 14 wherein each escort correlator is located ½ chip apart from the location of the corresponding finger correlator.

16. The method of claim 15 wherein each escort correlator is located in either side of the corresponding finger correlator.

17. The method of claim 14 wherein the weight vector w is estimated by a following equation: $w = R_u^{-1} h$, wherein $R_u$ and h are given by: $R_u = E_0 R_{ISI} + E_I R_{MUI} + N_0 R_n$ and $h = \sqrt{E_0} y_d$, $R_u$ is a matrix defining a total noise covariance, $R_{ISI}$, $R_{MUI}$ and $R_n$ represent autocorrelation of inter-symbol interference component, multiuser interference component and noise component, respectively, $E_0$, $E_I$ and $N_0$ represent energy per symbol period of a desired user, total energy per symbol period of the remaining users in a cell, and other-cell interference and additive white Gaussian noise, respectively, and $y_d$ represents a desired signal.

18. The method of claim 17 wherein the weight vector is estimated utilizing a total base station energy, the total base station energy is being determined by at least one of:
 estimating based on a received pilot sequence; and
 approximating from received common pilot channel (CPICH).

19. The method of claim 18 wherein:
 the total base station energy is overestimated when Ior/Ioc is positive, Ior and Ioc representing a total received power and a total interference power, respectively;
 the total base station energy is estimated as five (5) to ten (10) times a CPICH power: and
 the total base station energy is underestimated when Ior/Ioc is negative. Ior and Ioc representing "the total received power and the total interference power" for respectively.

20. The method of claim 17 wherein the weight vector is calculated disregarding inter-symbol interference.

21. The method of claim 17 wherein inversion of the matrix $R_u$ is performed by one of Choleski factorization and Gauss-Seidel iterations.

22. The method of claim 17 wherein energy per symbol period of the desired user is estimated using a pilot sequences, and the pilot sequence is transmitted via a dedicated physical control channel (DPCCH).

23. The method of claim 17 wherein update of the weight vector is varied depending on estimate of Doppler spread and speed of the desired user.

24. The method of claim 17 wherein delay estimates of the multipath components are to be static throughout duration of one frame and amplitude estimates of the multipath components are updated time slot by time slot.

25. The method of claim 17 wherein a lookup table is utilized in obtaining $R_{ISI}$, $R_{MUI}$ and $R_n$.

* * * * *

UNITED STATES PATENT AND TRADEMARK OFFICE
CERTIFICATE OF CORRECTION

PATENT NO. : 7,606,295 B2  Page 1 of 1
APPLICATION NO. : 11/173046
DATED : October 20, 2009
INVENTOR(S) : Daneshrad et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,606,295 B2 |
| APPLICATION NO. | : 11/173046 |
| DATED | : October 20, 2009 |
| INVENTOR(S) | : Daneshrad et al. |

It is certified that error appears in the above-identified patent and that said Letters Patent is hereby corrected as shown below:

ON THE TITLE PAGE

At Item (56), FOREIGN PATENT DOCUMENTS, page 2, left column, line 1, delete "JP 2007-080360 3/2004" and insert therefor --JP 2004-080360 3/2004--.

IN THE ABSTRACT

At Item (57), ABSTRACT, page 1, right column, line 5, after the word "path" delete "components" and insert therefor --component--.

IN THE SPECIFICATION

At column 6, line 30, before the word "denotes" delete "*1" and insert therefor --$*_1$--.

At column 6, line 34, before the words "is adequate:" delete "$\tau_i$)" and insert therefor --$\tau_1$)--.

IN THE CLAIMS

At claim 5, column 10, line 33, before the words "is a matrix" delete " $\sqrt{E_0 y_d}$ $R_u$ " and insert therefor -- $\sqrt{E_o} y_d \cdot R_u$ --.

At claim 5, column 10, line 40, before the word "represents" delete "$Y_d$" and insert therefor --$y_d$--.

At claim 7, column 10, line 57, after the word "power" delete "for".

At claim 18, column 12, line 6, after the word "energy", delete "is".

Signed and Sealed this
Twelfth Day of April, 2011

David J. Kappos
*Director of the United States Patent and Trademark Office*

CERTIFICATE OF CORRECTION (continued)
U.S. Pat. No. 7,606,295 B2

At claim 18, column 12, line 8, after the word "from" insert --a--.

At claim 19, column 12, line 18, after the word "power" delete "for".

At claim 22, column 12, line 26, after the word "pilot" delete "sequences," and insert therefor --sequence,--.